US012606433B2

(12) United States Patent　　(10) Patent No.:　US 12,606,433 B2
Almulla et al.　　　　　　　　(45) **Date of Patent:　\*Apr. 21, 2026**

(54) METHODS FOR PRODUCING LIQUID ORGANIC HYDROGEN CARRIERS (LOHC)

(71) Applicant: Saudi Arabian Oil Company, Dhahran (SA)

(72) Inventors: Faisal M. Almulla, Dhahran (SA); Anas S. Al-Aqeeli, Dhahran (SA); Guanghui Zhu, Dhahran (SA); Raed H. Abudawoud, Dhahran (SA)

(73) Assignee: Saudi Arabian Oil Company, Dhahran (SA)

( \* ) Notice: Subject to any disclaimer, the term of this patent is extended or adjusted under 35 U.S.C. 154(b) by 204 days.

This patent is subject to a terminal disclaimer.

(21) Appl. No.: 18/538,307

(22) Filed: Dec. 13, 2023

(65) Prior Publication Data

US 2025/0197201 A1　　Jun. 19, 2025

(51) Int. Cl.
C01B 3/0015　　　(2026.01)

(52) U.S. Cl.
CPC ...... C01B 3/0015 (2013.01); C01B 2203/065 (2013.01); C01B 2203/1052 (2013.01); C01B 2203/1082 (2013.01)

(58) Field of Classification Search
CPC ...... C01B 2203/065; C01B 2203/1052; C01B 2203/1082; C01B 3/0015; C10G 21/16;
(Continued)

(56) References Cited

U.S. PATENT DOCUMENTS 5,334,790 A　　8/1994　Richard et al.
9,005,571 B2　　4/2015　Biniwale et al.
(Continued)

FOREIGN PATENT DOCUMENTS

EP　　　2960204 A1　　12/2015
WO　WO-2012076758 A2 \*　6/2012　............ C10G 50/00
WO　WO-2022074336 A1 \*　4/2022　............ C01B 3/24
WO　　2022207418 A1　　10/2022

OTHER PUBLICATIONS

Abdin, et al., "Large-scale stationary hydrogen storage via liquid organic hydrogen carriers", iScience, vol. 24, No. 102966, Sep. 24, 2021.

(Continued)

*Primary Examiner* — Ellen M Mcavoy
*Assistant Examiner* — Chantel Graham
(74) *Attorney, Agent, or Firm* — DINSMORE & SHOHL LLP

(57)　　　　　ABSTRACT

A method for producing liquid organic hydrogen carriers (LOHCs). The method includes passing a hydrocarbon feed stream rich in aromatics to a selective hydrogenation reactor configured to saturate olefins selectively without aromatic saturation to generate a hydrotreated feed stream; passing the hydrotreated feed stream to a fractionation unit to form a light fraction stream and a heavy fraction stream split at 218° C. to 250° C.; and passing the light fraction stream to an aromatics extraction unit to form an aromatic compounds stream. The method also includes passing the non-aromatic compounds stream to a naphthene separator to generate a naphthenic stream; passing the aromatic compounds stream, the naphthenic stream, and an input hydrogen stream to a hydrogenation unit to form a hydrotreated effluent stream; and passing the hydrotreated effluent stream to a separator to remove unsaturated compounds to isolate the saturated compounds as a LOHC stream.

19 Claims, 3 Drawing Sheets

(58) Field of Classification Search

CPC ............ C10G 2300/4062; C10G 35/00; C10G
45/32; C10G 65/06; C10G 65/08; C10G
67/0409

See application file for complete search history.

(56) References Cited

U.S. PATENT DOCUMENTS

| | | |
|---|---|---|
| 10,322,391 B2 | 6/2019 | Bosmann et al. |
| 2008/0164139 A1* | 7/2008 | Cross .................... B01D 3/346 |
| | | 203/69 |
| 2020/0109340 A1 | 4/2020 | Alshareef |
| 2022/0298436 A1 | 9/2022 | Allison et al. |
| 2023/0002690 A1 | 1/2023 | Klaassen et al. |
| 2024/0158706 A1 | 5/2024 | Gazarian et al. |

OTHER PUBLICATIONS

Notification of Transmittal of the International Search Report and the Written Opinion of the International Searching Authority, or the Declaration dated Feb. 25, 2025 pertaining to International application No. PCT/US2024/059289 filed Dec. 10, 2024, pp. 1-12.

* cited by examiner

METHODS FOR PRODUCING LIQUID ORGANIC HYDROGEN CARRIERS (LOHC)

TECHNICAL FIELD

Embodiments of the present disclosure generally relate methods and systems utilized to transport hydrogen atoms while the hydrogen atoms are chemically bonded to hydrocarbons, and more specifically, to methods and systems for producing liquid organic hydrogen carriers for transporting hydrogen.

BACKGROUND

Demand for hydrogen is growing in importance as an environmentally friendly precursor chemical and fuel. Processes for the production and usage of hydrogen are relatively well developed. However, processes for the storage and transportation of hydrogen are still insufficient to meet the needs of the hydrogen industry. Generally, hydrogen is stored and transported in the form of compressed gaseous hydrogen molecules (e.g., at above 5,000 pounds per square inch). However, these conventional gaseous hydrogen transportation techniques are costly and inefficient. For example, the compression process consumes a large amount of energy (estimated to be 30% or more of the energy content of the hydrogen). Also, transport and storage of the compressed hydrogen requires expensive pressure vessels. Some of the hydrogen molecules can even escape through the walls of hydrogen containment vessels. The hydrogen can also cause embrittlement of the storage and transport vessels. As such, hydrogen storage and transportation in liquid phase offers great advantages due to the ability to accommodate higher capacity than gaseous tubes.

Liquid Organic Hydrogen Carriers (LOHCs) are great example of enabling the hydrogen storage, due to the higher density, through hydrogenation and dehydrogenation cycles. The use of Liquid Organic Hydrogen Carriers (LOHCs) has several advantages. One advantage is that LOHCs can store hydrogen in high density, which makes it easier to transport and use. This is because hydrogen is gaseous at ambient conditions, diffuses easily, and has a low energy density. Another advantage is that LOHCs are expected to be used in a wide variety of applications because of their excellent long-term storage properties and stability at room temperature. Several examples of LOHC compounds were identified as promising and economically efficient candidates such as methanol, toluene, monobenzyl toluene, and dibenzyl toluene.

BRIEF SUMMARY

Embodiments of the present disclosure address both the increasing demand for hydrogen and transportation of the same. Liquid Organic Hydrogen Carriers (LOHCs) enable improved hydrogen storage through hydrogenation and dehydrogenation cycles. The use of Liquid Organic Hydrogen Carriers (LOHCs) has several advantages. One advantage is that LOHCs can store hydrogen in high density, which makes it easier to transport and use. This is because hydrogen is gaseous at ambient conditions, it diffuses easily and has a low energy density making transport of substantial quantities challenging. Another advantage is that LOHCs are expected to be used in a wide variety of applications because of their excellent long-term storage properties and stability at room temperature. Several examples of LOHC compounds have been identified as promising and economically efficient candidates for transport of hydrogen such as methanol, toluene, monobenzyl toluene, and dibenzyl toluene. Embodiments of the present disclosure provide methods for producing liquid organic hydrogen carriers from hydrocarbon streams already available within a refinery. Accordingly the proliferation existing streams are utilized in an advantageous manner to generate LOHCs for transport and/or storage of hydrogen.

In accordance with one or more embodiments of the present disclosure, methods for producing liquid organic hydrogen carriers (LOHCs) are provided. The methods include passing a hydrocarbon feed stream to a selective hydrogenation reactor to generate a hydrotreated feed stream, wherein the hydrocarbon feed stream comprises at least 30% by weight of aromatics and naphthenes and the selective hydrogenation reactor is configured to saturate olefins selectively without aromatic saturation; passing the hydrotreated feed stream to a fractionation unit to form a light fraction stream and a heavy fraction stream, wherein the fractionation unit separates the light fraction stream and the heavy fraction stream at a cut point in the range of 218° C. to 250° C.; and passing the light fraction stream to an aromatics extraction unit to form an aromatic compounds stream and a non-aromatic compounds stream. The methods further include passing the non-aromatic compounds stream to a naphthene separator to generate a naphthenic stream and a non-naphthenic stream; passing the aromatic compounds stream, the naphthenic stream, and an input hydrogen stream to a hydrogenation unit to form a hydrotreated effluent stream, wherein the hydrotreated effluent stream comprises saturated compounds and unsaturated compounds; and passing the hydrotreated effluent stream to a separator to remove the unsaturated compounds to isolate the saturated compounds as a LOHC stream.

These and other embodiments are described in more detail in the Detailed Description. It is to be understood that both the foregoing general description and the following detailed description present embodiments of the presently disclosed technology, and are intended to provide an overview or framework for understanding the nature and character of the technology as it is claimed. The accompanying drawings are included to provide a further understanding of the presently disclosed technology and are incorporated into and constitute a part of this specification. The drawings illustrate various embodiments and, together with the description, serve to explain the principles and operations of the presently disclosed technology. Additionally, the drawings and descriptions are meant to be merely illustrative, and are not intended to limit the scope of the claims in any manner.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

Figure 1:
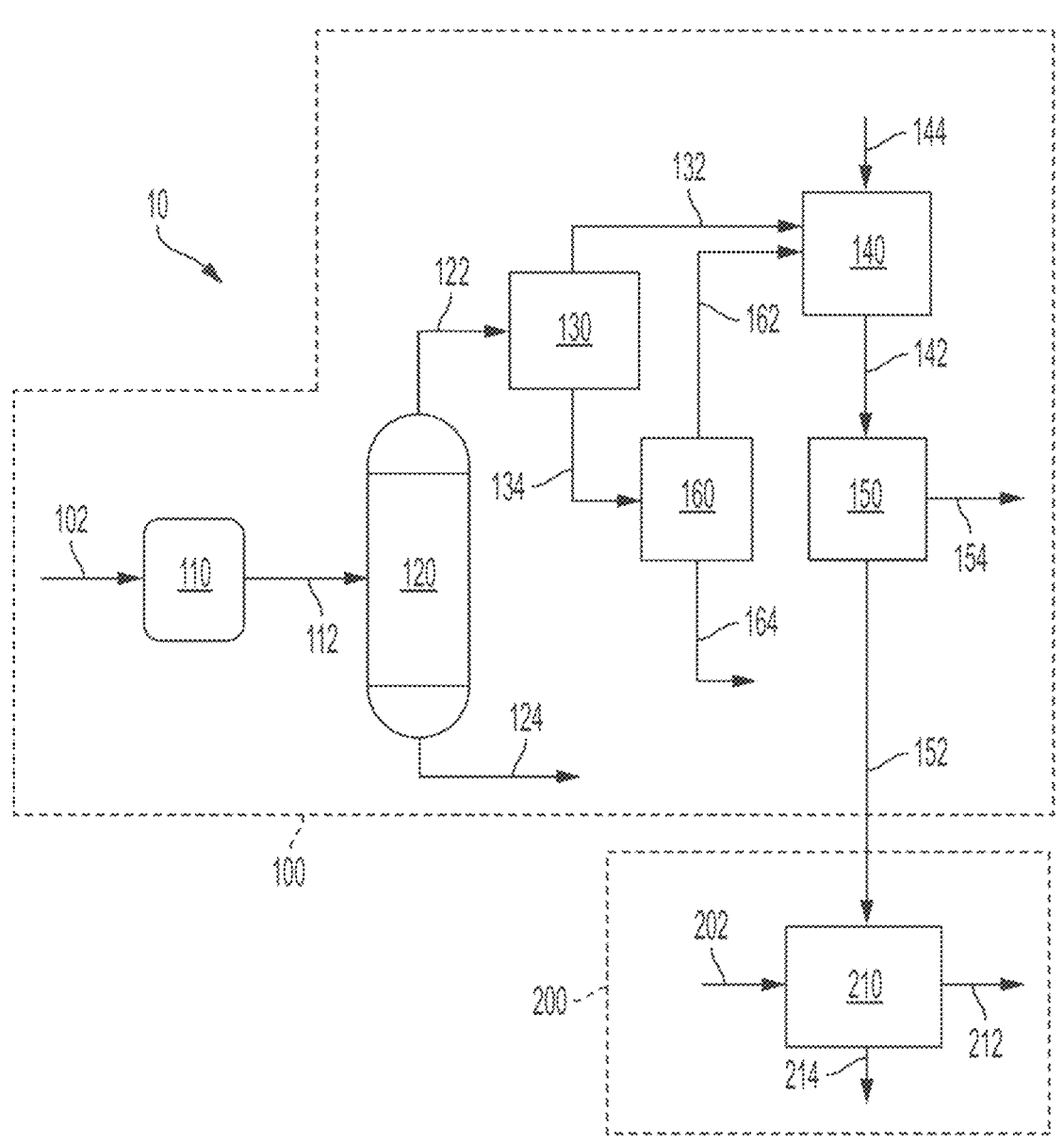
FIG. 1 schematically depicts a diagram of a system for producing liquid organic hydrogen carriers, according to one or more embodiments described in this disclosure.

For the purpose of describing the simplified schematic illustrations and descriptions of the relevant figures, the numerous valves, temperature sensors, electronic controllers and the like that may be employed and well known to those of ordinary skill in the art of certain chemical processing operations are not included. Further, accompanying components that are often included in typical chemical processing operations, such as air supplies, catalyst hoppers, and flue gas handling systems, are not necessarily depicted. However, operational components, such as those described in the present disclosure, may be added to the embodiments described in this disclosure.

It should further be noted that arrows in the drawings refer to process streams. However, the arrows may equivalently refer to transfer lines which may serve to transfer process streams between two or more system components. Additionally, arrows that connect multiple system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component. It should be understood that arrows in the relevant figures are not indicative of necessary or essential steps.

It should be understood that according to the embodiments presented in the relevant figures, an arrow between two system components may signify that the stream is not further processed between the two system components. In other embodiments, the stream signified by the arrow may have substantially the same composition throughout its transport between the two system components. Additionally, it should be understood that in one or more embodiments, an arrow may represent that at least 75 wt. %, at least 90 wt. %, at least 95 wt. %, at least 99 wt. %, at least 99.9 wt. %, or even 100 wt. % of the stream is transported between the system components. As such, in some embodiments, less than all of the streams signified by an arrow may be transported between the system components, such as if a slip stream is present.

It should be understood that two or more process streams are "mixed" or "combined" when two or more lines intersect in the schematic flow diagrams of the relevant figures. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 2:
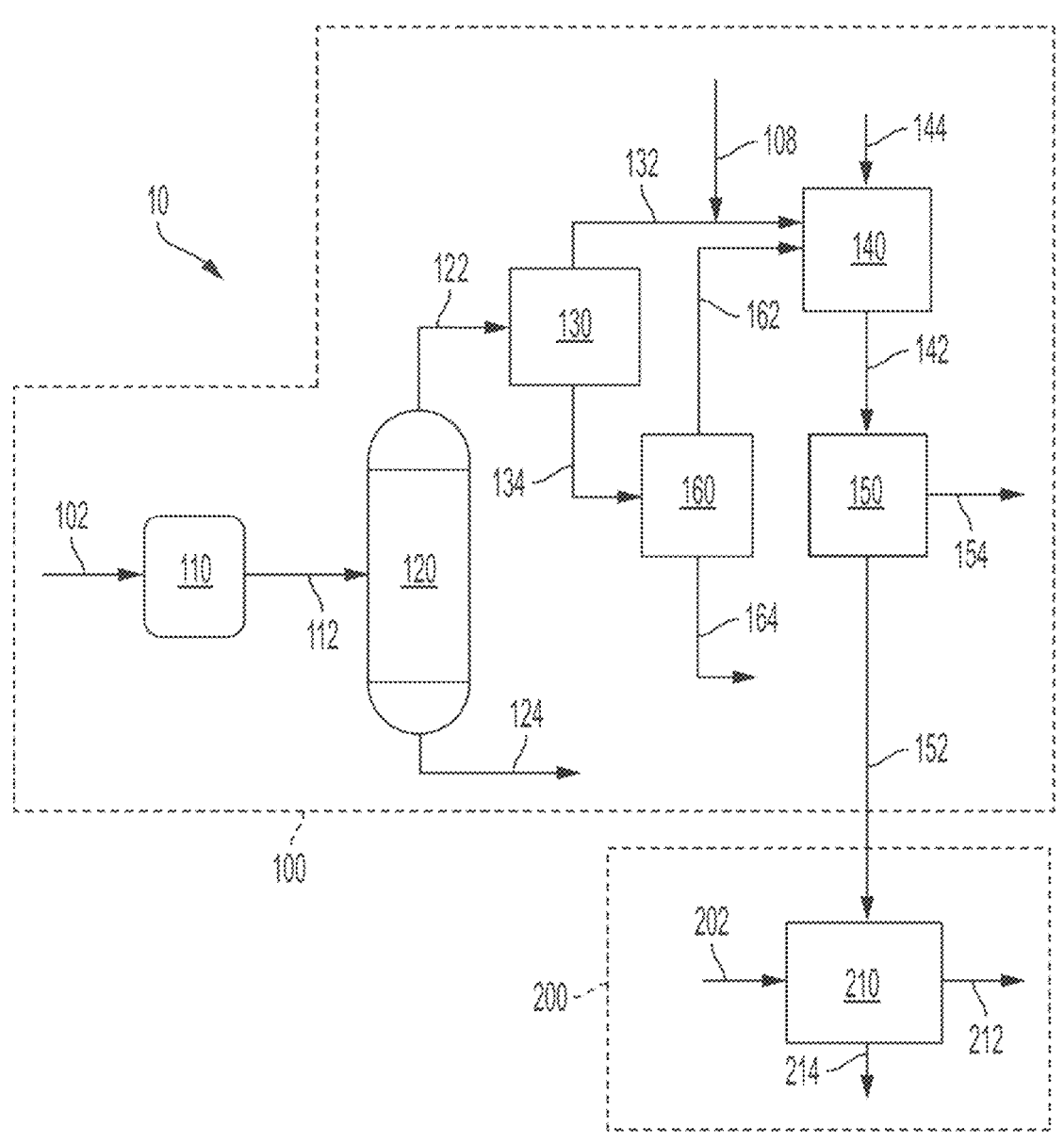
FIG. 2 schematically depicts a diagram of a system for producing liquid organic hydrogen carriers, according to one or more embodiments described in this disclosure.
Figure 3:
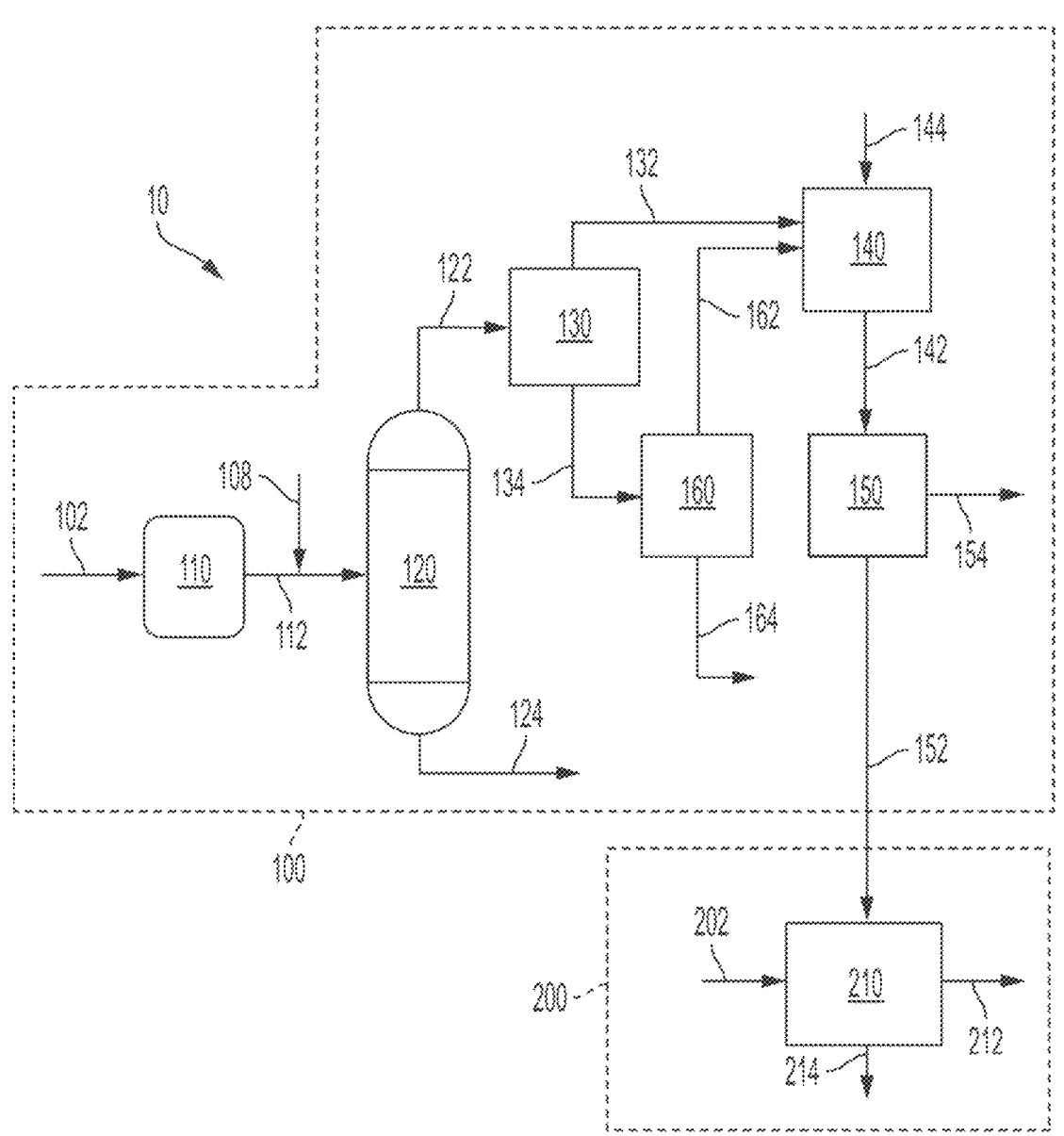
FIG. 3 schematically depicts a diagram of a system for producing liquid organic hydrogen carriers, according to one or more embodiments described in this disclosure.

Embodiments of the present disclosure relate to methods for producing liquid organic hydrogen carriers (LOHCs). In general, these methods are described herein in the context of one or more systems, shown in the drawings. As is discussed herein, the systems for producing LOHCs utilize methods including passing a hydrocarbon feed stream to a selective hydrogenation reactor to generate a hydrotreated feed stream; passing the hydrotreated feed stream to a fractionation unit to form a light fraction stream and a heavy fraction stream; passing the light fraction stream to an aromatics extraction unit to form an aromatic compounds stream and a non-aromatic compounds stream; passing the non-aromatic compounds stream to a naphthene separator to generate a naphthenic stream and a non-naphthenic stream; hydrotreating the aromatic compounds stream and the naphthenic stream to form a hydrotreated effluent stream; and passing the hydrotreated effluent stream to a separator to isolate the liquid organic hydrogen carriers as an LOHC stream from the remainder of the hydrotreated effluent stream. Further embodiments of the methods for producing LOHCs include passing a second hydrocarbon stream to the hydrogenation unit in combination with the aromatic compounds stream and the naphthenic stream. Yet further embodiments of the methods for producing LOHCs include transporting the LOHC stream from a first hydrocarbon processing facility to a second hydrocarbon processing facility and passing the LOHC stream to a dehydrogenation unit to form a dehydrogenated hydrocarbon stream and a hydrogen product stream. The embodiments of FIGS. 1-3 are similar or identical in many ways, respectively, but include differences as described herein. Description of the embodiments of FIGS. 1-3 may generally apply to the embodiments of the other figures, as would be understood by those skilled in the art. For example, concepts disclosed herein applicable to FIG. 1 may be equally applicable to FIG. 2, and vice versa, even if not explicitly stated as such herein.

As used in this disclosure, a "catalyst" refers to any substance which increases the rate of a specific chemical reaction. Catalysts described in this disclosure may be utilized to promote various reactions, such as, but not limited to, hydrotreating and dehydrogenation reactions. As used in this disclosure, a "hydrotreating catalyst" increases the rate of a hydrotreating reaction. As used in this disclosure, a "dehydrogenation catalyst" increases the rate of a dehydrogenation reaction. The methods described herein should not necessarily be limited by specific catalytic materials unless explicitly stated as such.

As used in this disclosure, a "separation unit" refers to any separation device or system of separation devices that at least partially separates one or more chemicals that are mixed in a process stream from one another. For example, a separation unit may selectively separate differing chemical species, phases, or sized material from one another, forming one or more chemical fractions. Examples of separation units include, without limitation, distillation columns, flash drums, knock-out drums, knock-out pots, centrifuges, cyclones, filtration devices, traps, scrubbers, expansion devices, membranes, solvent extraction devices, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation.

As used in this disclosure, "cracking" refers to a chemical reaction where a molecule having carbon-carbon bonds is broken into more than one molecule by the breaking of one or more of the carbon-carbon bonds; where a compound including a cyclic moiety, such as an aromatic, is converted to a compound that does not include a cyclic moiety; or where a molecule having carbon-carbon double bonds are reduced to carbon-carbon single bonds. Some catalysts may have multiple forms of catalytic activity, and calling a catalyst by one particular function does not render that catalyst incapable of being catalytically active for other functionality. In general, "hydrocracking" refers to cracking in the presence of hydrogen.

As used in this disclosure, "hydrocarbons" refers to compounds consisting of hydrogen atoms and carbon atoms.

The hydrocarbon feed stream 102 may comprise a variety of different hydrocarbons. In various embodiments, the hydrocarbon feed stream 102 is selected from one or more of fluid catalytic cracking (FCC) gasoline blend, delayed coker naphtha, pyrolysis fuel oil, hydrotreated naphtha, reformate, or pygas. FCC gasoline is a naphtha range material with octane and vapor pressure close to the quality specifications for finished gasoline. Delayed coker naphtha is a naphtha range product from a coker unit. Hydrotreated naphtha is a naphtha range material which has undergone hydrotreatement to remove impurities such as sulfur and/or nitrogen. Pygas, or pyrolysis gasoline, is a naphtha-range mixture with a high octane number which contains aromatics, olefins, and paraffins ranging from C5 to C12. Pygas is a by-product of high temperature naphtha, propane, and/or gasoil cracking during ethylene and propylene production. Accordingly, it will be appreciated that hydrocarbon stream generated as products or effleunts from a wide variety of existing refinery processed may be utilized as the hydrocarbon feed stream 102.

In one or more preferred embodiments, the hydrocarbon feed stream 102 comprises pyrolysis fuel oil. Pyrolysis fuel oil (PFO) is a heavy liquid product that is produced during the steam cracking of crude oil fractions. The composition of PFO depends on the feedstock and reaction conditions used during steam cracking. PFO derived from naphtha and vacuum gas oil has been found to be highly aromatic, with molar hydrogen-to-carbon (H/C) ratios lower than 1 and with a significant content of compounds with solubility characteristics typical for asphaltenes and coke. Further, PFO typically includes diaromatics as the dominant chemical family.

It will be appreciated that as aromatic compounds are utilized as liquid organic hydrogen carriers in accordance with one or more embodiments of the present disclosure, a substantial initial presence of aromatics within the hydrocarbon feed stream 102 is desirable. In various embodiments, the hydrocarbon feed stream 102 may comprise at least 30 weight percent (wt %) aromatic and naphthenic compounds, such as at least 35 wt %, at least 40 wt %, at least 45 wt %, at least 50 wt %, at least 55 wt %, at least 60 wt %, at least 70 wt %, or at least 5 wt % of aromatic and naphthenic compounds, on the basis of the total weight of the hydrocarbon feed stream 102.

In one or more embodiments, the hydrocarbon feed stream 102 comprises less than 0.1 percent by weight sulfur based on the total weight of the hydrocarbon feed stream 102. Elevated sulfur levels can lead to corrosion of equipment and catalyst poisoning in downstream processes. In various further embodiments, the hydrocarbon feed stream 102 comprises less than 0.08 wt % sulfur, less than 0.06 wt % sulfur, less than 0.02 wt % sulfur, less than 0.02 wt % sulfur, or less than 0.01 wt % sulfur.

In one or more embodiments, the hydrocarbon feed stream 102 comprises less than 400 parts per million (ppm) by weight nitrogen based on the total weight of the hydrocarbon feed stream 102. Elevated nitrogen levels can affect the performance of catalysts and cause issues in the refining process. In various further embodiments, the hydrocarbon feed stream 102 comprises less than 300 ppm of nitrogen, less than 250 ppm of nitrogen, less than 100 ppm of nitrogen, less than 200 ppm of nitrogen, or less than 50 ppm of nitrogen.

In one or more embodiments, the hydrocarbon feed stream 102 comprises less than 50 ppm by weight oxygen based on the total weight of the hydrocarbon feed stream 102. Presence of oxygen in the hydrocarbon feed stream 102 can lead to oxidation, reducing the stability of the hydrocarbons and causing issues in downstream processes. In various further embodiments, the hydrocarbon feed stream 102 comprises less than 40 ppm of oxygen, less than 30 ppm of oxygen, less than 25 ppm of oxygen, less than 20 ppm of oxygen, or less than 10 ppm of oxygen.

In one or more embodiments, the hydrocarbon feed stream 102 comprises less than 0.1 wt. % water, comprises less than 0.05 wt. % water, or comprises less than 0.02 wt. % water.

In one or more embodiments, the hydrocarbon feed stream 102 comprises less than 10 ppm of chlorine, less than 8 ppm of chlorine, less than 6 ppm of chlorine, less than 5 ppm of chlorine, or less than 1 ppm of chlorine.

An example composition of a hydrocracked heavy naphtha provided as the hydrocarbon feed stream 102 in accordance with one or more embodiments of the present disclosure is provided in Table 1. The composition of Table 1 is exemplary in nature and it will be appreciated that one or more embodiments encompass hydrocarbon feed streams 102 with greater and/or less percentages of each group.

TABLE 1

| Example Hydrocarbon Feed Stream Composition Hydrocracked heavy naphtha composition | | | |
| --- | --- | --- | --- |
| GROUP | WT % | VOL % | MOL % |
| Paraffin | 10.318 | 11.06 | 10.575 |
| I-Paraffins | 38.385 | 40.407 | 36.736 |
| Aromatics | 6.096 | 5.086 | 6.429 |
| Naphthenes | 44.738 | 43.002 | 45.838 |
| Olefins | 0.463 | 0.446 | 0.423 |

The hydrocarbon feed stream 102 is provided to a selective hydrogenation reactor 110. The selective hydrogenation reactor 110 is configured to saturate olefins selectively without aromatic saturation and generate a hydrotreated feed stream 112. Such selective saturation is achieved as olefins are much easier to saturate based on the equilibrium at lower hydrogen pressure. Olefin saturation is desirable as such operation prevents or reduces olefin polymerization and formation of gum which may deactivate the catalyst downstream or cause problem in storage and transportation.

In various embodiments, the selective hydrogenation reactor 110 may be operated at a reaction temperature from 100° C. to 200° C., such as from 100° C. to 190° C., from 100° C. to 180° C., from 110° C. to 200° C., from 110° C. to 190° C., from 110° C. to 180° C., from 120° C. to 200° C., from 120° C. to 190° C., from 120° C. to 180° C., or any subset thereof. Without wishing to be bound by theory, it is believed, greater temperatures may cause reaction runaway and melt the reactor components thus requiring lower temperature or less active catalysts to control the reaction rate.

In various embodiments, the selective hydrogenation reactor 110 may be operated at a pressure of from 1 bar to 100 bar, such as from 1 bar to 80 bar, from 10 bar to 100 bar, from 10 bar to 80 bar, from 20 bar to 100 bar, from 20 bar to 80 bar, from 30 bar to 100 bar, from 30 bar to 80 bar, from 40 bar to 100 bar, from 40 bar to 80 bar, or any subset thereof. To great a pressure will saturate the aromatics to naphthene. Too low a pressure will not be able to saturate the olefin.

In various embodiments, the f the selective hydrogenation reactor 110 may be operated from 40 bar to 80 bar may be operated at a liquid hourly space velocity (LHSV) of from $0.5 \ h^{-1}$ to $5 \ h^{-1}$, such as $1 \ h^{-1}$ to $5 \ h^{-1}$, $2 \ h^{-1}$ to $3 \ h^{-1}$, $0.5 \ h^{-1}$ to $4 \ h^{-1}$, $0.5 \ h^{-1}$ to $3 \ h^{-1}$, $0.5 \ h^{-1}$ to $2 \ h^{-1}$, or any subset thereof.

In one or more embodiments, the hydrotreated feed stream 112 is passed to a fractionation unit 120. Specifically, in one or more embodiments, the hydrotreated feed stream 112 is passed to the fractionation unit 120 to form a light fraction stream 122 and a heavy fraction stream 124. Fractionation of the hydrotreated feed stream 112 allows for selection of components from the hydrotreated feed stream 112 which are believed to be the most promising LOHC candidates. Specifically, species which are known to be LOHCs may be selected while removing species which are known to not serve as LOHCs.

The fractionation unit 120 may comprise any unit operation or system known to those skilled in the art for separating a hydrocarbon stream by vapor pressure. An example fractionation unit 120 is an atmospheric distillation unit. An atmospheric distillation unit utilizes fractional distillation by heating the feed to a temperature at which one or more fractions of the mixture will vaporize while leaving other fractions as liquid to separate the feed stream. Further, in various embodiments, the fractionation unit 120 may be a simple flash column or true boiling point distillation with at least 15 theoretical plates.

In one or more embodiments, the fractionation unit 120 separates the light fraction stream 122 and the heavy fraction stream 124 at a cut point in the range of 115° C. to 150° C. In various further embodiments, the fractionation unit 120 separates the light fraction stream 122 and the heavy fraction stream 124 at a cut point in the range of 115° C. to 140° C., 115° C. to 130° C., 120° C. to 150° C., 125° C. to 150° C., 120° C. to 140° C., or 120° C. to 130° C. It will be appreciated that maintaining the cut point at greater than 115° C. ensures that toluene which has a boiling point at 110.6° C. remains in the light fraction stream 122. Toluene is a species which is believed to serve as a LOHC with hydration to methyl cyclohexane and dehydration back to toluene storing and releasing hydrogen. The particular cut point of the fractionation unit 120 may be adjusted to tune the composition of the light fraction stream 122 to comprise desired species and exclude undesirable species, the undesirable species being included in the heavy fraction stream 124.

In one or more embodiments, the fractionation unit 120 may also generate an ultralight fraction stream (not illustrated) comprising hydrocarbons with boiling points less than within the desirable range for generating LOHCs. Such ultralight fraction, in one or more embodiments, may be recycled as a feed to the thermal treatment unit 110 for further processing. Such separation, in one or more embodiments, may be achieved with a discrete gas-liquid separator no shown).

In one or more embodiments, the fractionation unit 120 comprises a plurality of separation units. For case of illustration, the provided FIGS. 1-3 illustrate a single unit operation, but it will be appreciated that such unit operation may comprise multiple individual separator units to generate the disclosed product streams.

In or more embodiments, the aromatics extraction unit 130 separates the light fraction stream 122 into to an aromatic compounds stream 132 and a non-aromatic compounds stream 134. The aromatic compounds stream 132 is passed to the hydrogenation unit 140 for hydrotreating and further selection as LOHCs. The non-aromatic compounds stream 134 is passed to the naphthene separator 160 for separation and recovery of naphthenic compounds.

In one or more embodiments, the aromatics extraction unit 130 may be an extractive separation unit. In an extractive separation unit, a liquid-liquid extraction is performed to remove one or more compounds (such as aromatic compounds) from the bulk feedstock into a solvent. Specifically, the aromatics extraction unit 130 may utilize solvent extraction to separate the aromatic compounds stream 132 and the non-aromatic compounds stream 134 based on absorption of one or more components into a solvent. The solvent may then be separated in any suitable separation unit, such as, and without limitation, a series of flash vessels or a fractionator/distillation column that separates feedstock based on the boiling point, to remove the separated compounds. The aromatics extraction unit 130 may include any suitable separation unit, such as, and without limitation, a series of flash vessels or a fractionator/distillation column that separates feedstock based on the boiling point or separation based on molecule size with molecular sieves.

In one or more embodiments, the solvent utilized in the aromatics extraction unit 130 comprises an organic molecule with an aldehyde side group. Specifically, the use of organic molecules with an aldehyde side group for separating aromatics is associated with a specific class of compounds known as aldehyde-based solvents. An example of an aldehyde-based solvent is aldehyde-amine solvents, particularly those containing aldehyde functional groups such as benzaldehyde. The aldehyde functional group can form complexes with aromatic compounds, enhancing their solubility in the solvent. The selective interaction between the aldehyde side group and aromatic compounds allows for the separation of aromatics from other hydrocarbons. Advantages of these solvents include selectivity, solubility enhancement, and customization as the choice of aldehyde can be tailored based on the specific characteristics of the hydrocarbon mixture and the desired separation outcomes.

In one or more embodiments, the weight ratio of the light fraction stream 122 to solvent in the aromatics extraction unit 130 is in the range of 0.5 to 10. In further embodiments, the weight ratio of the light fraction stream 122 to solvent in the aromatics extraction unit 130 is in the range of 0.75 to 10, 1.0 to 10, 1.25 to 10, 1.5 to 10, 0.5 to 5, 1.0 to 5, or 1.5 to 5. Excess solvent can lead to increased operational cost, reduced efficiency and potential difficulties in separating and recovering the excess solvent from the extracted products. Excess solvent may also impact the quality of final products.

In one or more embodiments, the aromatics extraction unit 130 comprises a plurality of separation units. For ease of illustration, the provided FIGS. 1-3 illustrate a single unit operation, but it will be appreciated that such unit operation may comprise multiple individual separator units to generate the disclosed product streams.

In one or more embodiments, a naphthene separator 160 may separate the non-aromatic compounds stream 134 into a naphthenic stream 162 and a non-naphthenic stream 164. The naphthene separator 160 may be any separation unit capable of removing a naphthenic stream 162 from the non-aromatic compounds stream 134. In one or more embodiments, the naphthene separator 160 may be an extractive separation unit. As previously noted, in an extractive separation unit, a liquid-liquid extraction is performed to remove one or more compounds from the bulk feedstock into a solvent. The solvent may then be separated in any suitable separation unit. Further, in one or more embodiments, the naphthene separator 160 may include any suitable separation unit, such as, and without limitation, a series of flash vessels or a fractionator/distillation column that separates feedstock based on the boiling point.

In one or more embodiments, the solvent utilized in the naphthene separator 160 comprises a polar solvent. Examples of such polar solvents include aliphatic polyamines such as ethylene diamine, diethylene triamine, triethylene tetramine, phenol, furfural, acetonitrile, sulfolane, dimethylsulfoxide (DMSO) and n-methyl pyrrolidone (NMP), etc. and mixtures thereof.

In one or more embodiments, the weight ratio of the non-aromatic compounds stream 134 to solvent in the naphthene separator 160 is in the range of 0.5 to 10. In further embodiments, the weight ratio of the the non-aromatic compounds stream 134 to solvent in the naphthene separator 160 is in the range of 0.75 to 10, 1.0 to 10, 1.25 to 10, 1.5 to 10, 0.5 to 5, 1.0 to 5, or 1.5 to 5. Excess solvent can lead to increased operational cost, reduced efficiency and potential difficulties in separating and recovering the excess solvent from the extracted products. Excess solvent may also impact the quality of final products.

In one or more embodiments, the non-naphthenic stream 164 may comprise primarily acyclic hydrocarbons (such as linear hydrocarbons) along with limited aromatics through imperfect separation in the aromatics extraction unit 130. In one or more embodiments, the non-naphthenic stream 164 may comprise at least 50 wt. %, at least 60 wt. %, at least 70 wt. %, at least 80 wt. %, at least 90 wt. %, or at least 95 wt. % of acyclic hydrocarbons, on the basis of the total weight of non-naphthenic stream 164.

In one or more embodiments, naphthenic stream 162 may comprise non-aromatic cyclic hydrocarbons. In some embodiments, the non-aromatic cyclic hydrocarbons of the naphthenic stream 162 may be saturated cyclic hydrocarbons such as oOne ring naphthene including cyclohexane, methylcyclohexane, dimethylcyclohexane, or methylethylcyclohexane. In various embodiments, the naphthenic stream 162 may comprise at least 50 wt. %, at least 60 wt. %, at least 70 wt. %, at least 80 wt. %, at least 90 wt. %, or at least 95 wt. % of non-aromatic cyclic hydrocarbons, on the basis of the total weight of the naphthenic stream 162.

In one or more embodiments, the naphthene separator 160 comprises a plurality of separation units. For ease of illustration, the provided FIGS. 1-3 illustrate a single unit operation, but it will be appreciated that such unit operation may comprise multiple individual separator units to generate the disclosed product streams.

According to one or more embodiments, the aromatic compounds stream 132, the naphthenic stream 164, and an input hydrogen stream 144 may be passed to the hydrogenation unit 140. The aromatic compounds stream 132 and the naphthenic stream 164 may be combined before being passed to hydrogenation unit 140 or may be combined therein.

Similarly, the input hydrogen stream 144 may be combined with the aromatic compounds stream 132, the naphthenic stream 164, or both before being passed to hydrogenation unit 140 or may be combined therein.

The input hydrogen stream 144 may comprise hydrogen gas. In one or more embodiments, the input hydrogen stream 144 may comprise at least 80 wt. %, at least 90 wt. %, at least 95 wt. %, at least 99 wt. %, or at least 99.9 wt. % of hydrogen gas, on the basis of the total weight of input hydrogen stream 144.

The hydrogenation unit 140 may hydrotreat the aromatic compounds stream 132 and the naphthenic stream 162. Hydrotreating refers to the process of contacting a hydrocarbon with a hydrotreating catalyst in the presence of hydrogen, thus hydrogenating the hydrocarbons. Generally, hydrotreating does not crack hydrocarbons. Rather, hydrotreating may saturate hydrocarbons without decreasing their chain length. Additionally, hydrotreating may also be used to remove contaminants from hydrocarbons, such as sulfur and metals.

In one or more embodiments, the hydrogenation unit 140 may utilize a hydrotreating catalyst. Any hydrotreating catalyst known to those skilled in the art may be utilized as selected based on the composition of the feed including the aromatic compounds stream 132 and the naphthenic stream 162 provided to the hydrogenation unit 140. In various embodiments, the hydrotreating catalyst may comprise cobalt, molybdenum, tungsten, nickel-tungsten, nickel-cobalt, or nickel-molybdenum, on an alumina, silica-alumina, or zeolite support.

In various embodiments, the hydrogenation unit 140 may be operated at a reaction temperature from 150° C. to 300° C., such as from 150° C. to 275° C., from 150° C. to 250° C., from 175° C. to 300° C., from 175° C. to 275° C., from 175° C. to 250° C., from 200° C. to 300° C., from 200° C. to 275° C., from 200° C. to 250° C., or any subset thereof.

In various embodiments, the hydrogenation unit 140 may be operated at a pressure of from 1 bar to 50 bar, such as from 1 bar to 40 bar, from 1 bar to 35 bar, from 5 bar to 50 bar, from 5 bar to 35 bar, from 10 bar to 50 bar, from 10 bar to 35 bar, from 15 bar to 50 bar, from 15 bar to 35 bar, or any subset thereof.

In various embodiments, the hydrogenation unit 140 may be operated at a liquid hourly space velocity (LHSV) of from $0.5 \ h^{-1}$ to $5 \ h^{-1}$, such as $1 \ h^{-1}$ to $5 \ h^{-1}$, $2 \ h^{-1}$ to $3 \ h^{-1}$, $0.5 \ h^{-1}$ to $4 \ h^{-1}$, $0.5 \ h^{-1}$ to $3 \ h^{-1}$, $0.5 \ h^{-1}$ to $2 \ h^{-1}$, or any subset thereof.

The hydrogenation unit 140 may be an existing unit operation or reactor already available within an existing refinery. For example, the hydrogenation unit 140 can constitute a batch reactor, a semi-batch reactor, a flow fluidized reactor, a flow fixed reactor or their combinations. Examples of hydrogenation units 140 which may be utilized within existing refinery architecture include hydrotreaters, hydrocrackers, hydrodesulfurization units, ammonia production units such as Haber-Bosch process reactors, and methanol production units from syngas and/or $CO_2$. The hydrogenation unit 140 units are those typically processing natural gas, naphtha, full range naphtha, light naphtha, heavy naphtha, kerosene, jet-fuel, distillate, diesel, fuel oil, vacuum gas oil (VGO), gasoline, atmospheric resid and vacuum resid, $CO_2$, nitrogen, or their mixtures.

Still referring to FIG. 1, hydrogenation unit 140 may produce hydrotreated effluent stream 142. The hydrotreated effluent stream 142 comprises saturated compounds and unsaturated compounds. It will be appreciated that the hydrotreated effluent stream 142 further comprises unreacted hydrogen. The unreacted hydrogen may be recycled or used as feed to any other existing processes within the refinery. LOHCs in their unsaturated state comprise organic molecules with C—C double or triple bonds and the hydrogenation unit 140 saturates such LOHCs resulting in the addition of hydrogen atoms and cleavage of the C—C double and triple bonds. Accordingly, selection of LOHCs may be determined based on selection of compounds which were successfully saturated with hydrogen in the hydrogenation unit 140. As such, the saturated compounds in the hydrotreated effluent stream 142 are considered to be the LOHCs sought in accordance with the present disclosure.

The hydrotreated effluent stream 142 comprises the hydrotreated aromatic compounds stream 132. The hydrotreated effluent stream 142 may have a greater ratio of hydrogen to carbon than the aromatic compounds stream 132 as a result of the hydrogenation of the aromatic compounds stream 132 to generate the saturated compounds considered as saturated liquid organic hydrogen carriers. For example, the degree of saturation of the hydrocarbons in the hydrotreated effluent stream 142 may be higher than the degree of saturation in the aromatic compounds stream 132.

In one or more embodiments, processing of the aromatic compounds stream 132 in the hydrogenation unit 140 reduces or eliminates the presence of sulfur and nitrogen containing compounds. The hydrotreated effluent stream 142 may comprise less than 1 wt %, such as less than 0.5 wt %, less than 0.1 wt %, less than 0.01 wt %, or even less than 0.001 wt % of the combined weight of sulfur and nitrogen.

As described herein, in some embodiments the hydrotreated effluent stream 142 may be passed to a separator 150. Separator 150 may remove the unsaturated compounds from the hydrotreated effluent stream 142 to isolate the saturated compounds as a LOHC stream 152. The unsaturated compounds are removed as a non-LOHC stream 154. The separator 150 may be any separation unit capable of separating the liquid organic hydrogen carriers from the remainder of the hydrotreated effluent stream 142. The non-LOHC stream 154 including the unsaturated compounds removed from the hydrotreated effluent stream 142 may be further processed to recover the unsaturated compounds from the non-LOHC stream 154.

In one or more embodiments, the separator 150 may utilize molecular sieve separation to generate the LOHC stream 152 based on based on adsorption of the unsaturated compounds in the hydrotreated effluent stream 142 onto a carrier. In various embodiments, the carrier which adsorbs the unsaturated compounds in the hydrotreated effluent stream 142 may comprise a molecular sieve, a zeolite catalyst, activated carbon, or amorphous silica. For example, zeolites with medium to large pores, such as those in the range of 8-12 membered rings like ZSM-5, preferentially adsorb smaller molecules like olefins while allowing larger saturated hydrocarbons to pass through.

In one or more embodiments, the adsorption of the unsaturated compounds for removal from the hydrotreated effluent stream 14 in the separator 150 is performed at a temperature between 10° C. and 80° C. In various further embodiments, the adsorption of the unsaturated compounds for removal from the hydrotreated effluent stream 14 in the separator 150 is performed at a temperature between 10° C. and 80° C., 10° C. and 70° C., 10° C. and 60° C., 10° C. and 50° C., 10° C. and 40° C., 20° C. and 80° C., 20° C. and 60° C., or 20° C. and 40° C. Separation is intentionally performed at mild operating conditions to improve separation and obtain the LOHC stream 152 which minimizes inclusion of species which would not serve as LOHCs. Specifically, as appreciated by one skilled in the art, at elevated temperatures molecular sieves and other carriers released adsorbed species resulting in a less pure effluent. Further, adsorption at high temperature may lead to breakdown or undesired reactions of the adsorbate.

In one or more embodiments, the separator 150 may be an extractive separation unit. Specifically, the separator 150 may utilize solvent extraction to separate the saturated compounds and unsaturated compounds in the hydrotreated effluent stream 142 based on absorption of one or more components into a solvent. The solvent may then be separated in any suitable separation unit, such as, and without limitation, a series of flash vessels or a fractionator/distillation column that separates feedstock based on the boiling point, to remove the separated compounds.

In one or more embodiments, the solvent utilized in the separator 150 is selected from those commonly used in refining or petrochemical processes to selectively dissolve unsaturated hydrocarbons such as olefins. For example, liquid propane may be utilized to selectively dissolve the unsaturated hydrocarbons.

In one or more embodiments, the weight ratio of the hydrotreated effluent stream 142 to solvent in the separator 150 is in the range of 0.5 to 10. In further embodiments, the weight ratio of the hydrotreated effluent stream 142 to solvent in the separation unit 150 is in the range of 0.75 to 10, 1.0 to 10, 1.25 to 10, 1.5 to 10, 1.75 to 10, 2.0 to 10, or 2.5 to 10.

In one or more embodiments, the separator 150 comprises a plurality of separation units. For ease of illustration, the provided FIGS. 1-3 illustrate a single unit operation, but it will be appreciated that such unit operation may comprise multiple individual separator units to generate the disclosed product streams.

In one or more embodiments, a second hydrocarbon stream 108 may be provided to the hydrogenation unit 140 in combination with the aromatic compounds stream 132 and the naphthenic stream 162. Referring to FIG. 2, a schematic illustration of one or more generalized embodiments of the present disclosure is presented with illustration of a second hydrocarbon stream 108 being introduced to the hydrogenation unit 140 as a separate stream from the aromatic compounds stream 132 and the naphthenic stream 162 with any mixing occurring within the hydrogenation unit 140. However, it will be appreciated that the second hydrocarbon stream 108, the aromatic compounds stream 132, and the naphthenic stream 162 may be combined in any combination before introduction to the hydrogenation unit 140.

The composition of the hydrocarbon streams as fed to the hydrogenation unit 140 may vary from 0.1 wt % to 100 wt. % of the aromatic compounds stream 132 and the naphthenic stream 162 with the remainder comprising the second hydrocarbon stream 108. In various embodiments, the hydrocarbon feed to the hydrogenation unit 140 may comprise 0.1 to 100 wt. % of the aromatic compounds stream 132 and the naphthenic stream 162, 20 to 100 wt. % of the aromatic compounds stream 132 and the naphthenic stream 162, 40 to 100 wt. % of the aromatic compounds stream 132 and the naphthenic stream 162, 60 to 100 wt. % of the aromatic compounds stream 132 and the naphthenic stream 162, 80 to 100 wt. % of the aromatic compounds stream 132 and the naphthenic stream 162, or substantially 100 wt. % the aromatic compounds stream 132 and the naphthenic stream 162. In one or more embodiments, the second hydrocarbon stream 108 may be a heavy naphtha stream or an aromatics-rich stream.

In one or more embodiments, the second hydrocarbon stream 108 may be provided to the fractionation unit 120 in combination with the hydrotreated feed stream 112. Referring to FIG. 3, a schematic illustration of one or more generalized embodiments of the present disclosure is presented with illustration of a second hydrocarbon stream 108 being combined with the hydrotreated feed stream 112 prior to introduction to the fractionation unit 120. However, it will be appreciated that the second hydrocarbon stream 108 and the hydrotreated feed stream 112 may be provided as separate streams to the fractionation unit 120.

The composition of the hydrocarbon streams as fed to the fractionation unit 120 may vary from 0.1 wt % to 100 wt. % of the hydrotreated feed stream 112 with the remainder comprising the second hydrocarbon stream 108. In various embodiments, the hydrocarbon feed to the fractionation unit 120 may comprise 0.1 to 100 wt. % of the hydrotreated feed stream 112, 20 to 100 wt. % of the hydrotreated feed stream 112, 40 to 100 wt. % of the hydrotreated feed stream 112, 60 to 100 wt. % of the hydrotreated feed stream 112, 80 to 100 wt. % of the hydrotreated feed stream 112, or substantially 100 wt. % the hydrotreated feed stream 112. In one or more embodiments, the second hydrocarbon stream 108 may be a heavy naphtha stream or an aromatics-rich stream.

The heavy naphtha stream when provided as the second hydrocarbon stream 106 may refer to a hydrocarbon cut, such as a cut of a crude oil. The heavy naphtha stream may have an initial boiling point (IBP) of from 80° C. to 100° C., such as from 80° C. to 95° C., from 85° C. to 100° C., from 88° C. to 100° C., from 80° C. to 92° C., or from 88° C. to 92° C. The heavy naphtha stream may have a final boiling point (FBP) of from 180° C. to 220° C., such as from 180° C. to 215° C., from 180° C. to 210° C., from 180° C. to 205° C., from 185° C. to 220° C., from 190° C. to 220° C., from 195° C. to 220° C., from 185° C. to 215° C., from 190° C. to 210° C., from 195° C. to 205° C., or any subset thereof. The heavy naphtha stream may comprise or consist of hydrocarbons.

The aromatics-rich stream when provided as the second hydrocarbon stream 108 may comprise a stream comprising at least 50 wt % aromatic compounds %, such as at least 60 wt %, at least 70 wt %, at least 80 wt %, at least 90 wt %, at least 95 wt %, at least 99 wt %, or even at least 99.9 wt % of aromatic compounds, on the basis of the total weight of the aromatics-rich stream. In one or more embodiments, the aromatic-rich stream may comprise at least 50 wt % C9+ aromatic compounds (aromatic compounds having at least 9 carbon atoms). Suitable C9+ aromatic compounds may include, without limitation, benzyl toluene, dibenzyl toluene, methylindole, phenazine, and ethylcarbazole. Further, in one or more embodiments, suitable C9+ aromatic compounds include any bi-cyclic or poly cyclic aromatic hydrocarbon. In various embodiments, the aromatics-rich stream may comprise at least 50 wt %, such as at least 60 wt %, at least 70 wt %, at least 80 wt %, at least 90 wt %, at least 95 wt %, at least 99 wt %, or even at least 99.9 wt % of the C9+ aromatic compounds, on the basis of the total weight of the aromatics-rich stream.

Now referring to each of FIGS. 1-3, where the system 10 for producing liquid organic hydrogen carriers may include at least a first hydrocarbon processing facility 100 and a second hydrocarbon processing facility 200, where the first hydrocarbon processing facility 100 and a second hydrocarbon processing facility 200 are in different geographic locations, as described herein. In general, a single hydrocarbon processing facility, such as the first hydrocarbon processing facility 100 and a second hydrocarbon processing facility 200, is a processing facility that is only locally integrated with other processing facilities, and generally refers to an integrated complex capable of transforming its respective hydrocarbon feedstock into its respective products. For example, a single hydrocarbon processing facility may be under the control of a single body, such as a single control room or manager. In one or more embodiments, each of the first hydrocarbon processing facility 100 and the second hydrocarbon processing facility 200 may independently be oil refineries. For example, the first hydrocarbon processing facility 100 and a second hydrocarbon processing facility 200 may be oil refineries, respectively, that are in different geographic regions. Geographic regions may refer to portions of the Earth's surface that are divided by physical characteristics, such as hemispheres of the earth, continents or portions thereof, climates, altitudes, proximity to mountains or bodies of water; or socio-political characteristics, such as predominant languages, nation-states, provinces, or cities. The first hydrocarbon processing facility 100 and the second hydrocarbon processing facility 200 may be separate from one another with distance or other barrier making transfer of products between first hydrocarbon processing facility 100 and the second hydrocarbon processing facility 200 challenging or impractical under typical circumstances. For example, the first hydrocarbon processing facility 100 and the second hydrocarbon processing facility 200 may be at least 1 km apart from one another, such as at least 100 km, at least 200 km, at least 500 km, or at least 1000 km. In one or more embodiments, the first hydrocarbon processing facility 100 and the second hydrocarbon processing facility 200 may reside at different latitudes or different time zones.

It will be appreciated that the distance or other barrier between the first hydrocarbon processing facility 100 and the second hydrocarbon processing facility 200 which is considered challenging or impractical under typical circumstances may depend on the specific species requiring transport. For example, the physical distance between the first hydrocarbon processing facility 100 and the second hydrocarbon processing facility 200 may make conventional transportation of hydrogen between the first hydrocarbon processing facility 100 and the second hydrocarbon processing facility 200 difficult. Use of the present methods and systems may allow cheaper and more efficient transport of hydrogen between the first hydrocarbon processing facility 100 and the second hydrocarbon processing facility 200, thereby allowing an operator to take advantage of cheaper and/or renewable sources of electricity available near the first hydrocarbon processing facility 100. In some embodiments, the first hydrocarbon processing facility 100 and the second hydrocarbon processing facility 200 may be located at different latitudes, which may allow the operator to take advantage of variations in energy production, such as the increased production of electricity of a given solar panel when placed closer to the equator.

As is shown in FIGS. 1-3, the first hydrocarbon processing facility 100 may comprise the thermal treatment unit 110, the fractionation unit 120, the aromatics extraction unit 130, the naphthene separator 160, the at least one hydrogenation unit 140, and the separator 150, as present. Further, the second hydrocarbon processing facility 200 may comprise the dehydrogenation unit 210.

In one or more embodiments and with reference to FIGS. 1-3, the LOHC stream 152, or a portion thereof, may be transported from the first hydrocarbon processing facility 100 to the second hydrocarbon processing facility 200. Transporting may refer to the process of physically moving hydrocarbons, and to the process of preparing the hydrocarbons to be physically moved, from the first hydrocarbon processing facility 100 to the second hydrocarbon processing facility 200, and to the storage of hydrocarbons before, during, or after physical movement of the hydrocarbons. Where hydrogen is transported, the hydrogen may be transported in the form of hydrogen atoms covalently bonded to hydrocarbon molecules. In one or more embodiments, transporting the LOHC stream 152, or a portion thereof, may comprise transporting the LOHC stream 152, or a portion thereof, from the first hydrocarbon processing facility 100 to the second hydrocarbon processing facility 200 by tanker truck, train, ship, and/or pipeline. In one or more embodiments, the hydrocarbons may be transported from the first hydrocarbon processing facility 100 to the second hydrocarbon processing facility 200 by tanker truck, train, and/or ship. A time of at least 2 weeks, such as at least 1 month, at least 2 months, or at least 6 months, may pass between hydrotreating the aromatic compounds stream 132 and dehydrogenating the LOHC stream 152. The transportation step may include storing the hydrocarbons at the first hydrocarbon processing facility 100, the second hydrocarbon processing facility 200, at an intermediate storage or processing facility, or in the transportation vessel itself. The temporal difference between the hydrotreating and dehydrogenating steps may allow the operator to store intermittent electricity in the form of hydrogen for use during times of higher demand, such as storing summer solar power for winter.

Still referring to FIGS. 1-3, the LOHC stream 152, or a portion thereof, may be passed to a dehydrogenation unit 210 to form hydrogen product stream 212 and dehydrogenated LOHC stream 214. The dehydrogenation unit 210 may be any refinery process unit capable of removing hydrogen atoms from a hydrocarbon molecule to form hydrogen gas. Suitable refinery process units for use as the dehydrogenation unit 210 include, for example, steam crackers, catalytic reformers, aromatization units, and the like. For example, the dehydrogenation unit 210 may be any single independent dehydrogenation unit such as a propane to propene unit. Where the dehydrogenation unit 210 is a catalytic reformer which contacts the hydrocarbons with a catalyst, the catalyst may comprise iron (such as iron (III) oxide), potassium oxide, potassium chloride, noble metal (Pt or Re) supported on a silica or silica-alumina base, or a combination thereof. The catalytic reformer may operate at a reaction temperature of from 50° C. to 700° C., such as from 100° C. to 700° C., from 200° C. to 700° C., from 300° C. to 700° C., from 400° C. to 700° C., from 50° C. to 600° C., from 200° C. to 600° C., from 300° C. to 600° C., from 400° C. to 600° C., or any subset thereof; a reaction pressure of from 1 bar to 50 bar, such as from 1 bar to 30 bar, from 1 bar to 20 bar, from 1 bar to 10 bar, from 5 bar to 50 bar, from 10 bar to 50 bar, from 20 bar to 50 bar, from 30 bar to 50 bar, or any subset thereof; and a liquid hourly space velocity (LHSV) of from 0.5 h$^{-1}$ to 5 h$^{-1}$, such as from 0.5 h$^{-1}$ to 4 h$^{-1}$, from 0.5 h$^{-1}$ to 3 h$^{-1}$, from 0.5 h$^{-1}$ to 2 h$^{-1}$, from 0.5 h$^{-1}$ to 1 h$^{-1}$, from 1 h$^{-1}$ to 5 h$^{-1}$, from 2 h$^{-1}$ to 5 h$^{-1}$, from 3 h$^{-1}$ to 5 h$^{-1}$, from 4 h$^{-1}$ to 5 h$^{-1}$, or any subset thereof.

In one or more embodiments, the dehydrogenated LOHC stream 214 may comprise hydrocarbons and have a lower hydrogen to carbon ratio than the LOHC stream 152. For example, the dehydrogenated LOHC stream 214 may have a lower degree of saturation than the LOHC stream 152.

In one or more embodiments, hydrogen product stream 212 may comprise hydrogen gas, such as at least 80 wt. %, at least 90 wt. %, at least 99 wt. %, at least 99.9 wt. %, at least 99.99 wt. %, or 99.999 wt. % of hydrogen gas, on the basis of the total weight of the hydrogen product stream 212. The hydrogen product stream 212 may comprise less than 500 parts per million by weight (ppm), less than 250 ppm, less than 100 ppm, less than 50 ppm, less than 20 ppm, or less than 10 ppm, less than 5 ppm, less than 2.5 ppm, or less than 1 ppm of each of sulfur and carbon monoxide. One practical and growing application for hydrogen gas is for use in fuel cells. Generally, low temperature fuel cells use precious metal catalysts which are susceptible to poisoning by sulfur and CO in their hydrogen fuels. Thus, it may be desirable for the hydrogen product stream 212 to contain relatively low amounts of sulfur and CO.

It should now be understood the various aspects of the method and associated system for producing liquid organic hydrogen carriers (LOHCs) are described and such aspects may be utilized in conjunction with various other aspects.

According to a first aspect, a method for producing liquid organic hydrogen carriers (LOHCs) includes passing a hydrocarbon feed stream to a selective hydrogenation reactor to generate a hydrotreated feed stream, wherein the hydrocarbon feed stream comprises at least 30% by weight of aromatics and naphthenes and the selective hydrogenation reactor is configured to saturate olefins selectively without aromatic saturation; passing the hydrotreated feed stream to a fractionation unit to form a light fraction stream and a heavy fraction stream, wherein the fractionation unit separates the light fraction stream and the heavy fraction stream at a cut point in the range of 218° C. to 250° C.; passing the light fraction stream to an aromatics extraction unit to form an aromatic compounds stream and a non-aromatic compounds stream; passing the non-aromatic compounds stream to a naphthene separator to generate a naphthenic stream and a non-naphthenic stream; passing the aromatic compounds stream, the naphthenic stream, and an input hydrogen stream to a hydrogenation unit to form a hydrotreated effluent stream, wherein the hydrotreated effluent stream comprises saturated compounds and unsaturated compounds; and passing the hydrotreated effluent stream to a separator to remove the unsaturated compounds to isolate the saturated compounds as a LOHC stream.

A second aspect includes the method of the first aspect in which the hydrocarbon feed stream comprises a pyrolysis fuel oil.

A third aspect includes the method of the first or second aspect in which the selective hydrogenation reactor operates at an operating temperature of 100° C. to 200° C. and a pressure of from 1 to 100 bar.

A fourth aspect includes the method of any of the first through thirds aspects in which the aromatics extraction unit utilizes solvent extraction to separate the aromatic compounds stream and the non-aromatic compounds stream based on absorption of one or more components into a solvent.

A fifth aspect includes the method of the fourth aspect in which the solvent utilized in the aromatics extraction unit comprises an organic molecule with an aldehyde side group.

A sixth aspect includes the method of the fourth or fifth aspect in which the weight ratio of the light fraction stream to solvent in the aromatics extraction unit is in the range of 1.5 to 10.

A seventh aspect includes the method of any of the first through sixth aspects in which the naphthene separator utilizes solvent extraction to separate the naphthenic stream and the non-naphthenic stream based on absorption of one or more components into a solvent.

An eighth aspect includes the method of the seventh aspect in which the solvent utilized in the naphthene separator comprises a polar solvent.

A ninth aspect includes the method of any of the first through eighth aspects in which the hydrogenation unit is operated at reaction conditions of from 150° C. to 300° C. and a pressure of from 1 to 50 bar.

A tenth aspect includes the method of any of the first through ninth aspects in which the hydrogenation unit comprises a hydrotreating catalyst, the hydrotreating catalyst comprising cobalt, molybdenum, or tungsten on an alumina support.

An eleventh aspect includes the method of any of the first through tenth aspects in which the separator utilizes molecular sieve separation to generate the LOHC stream based on adsorption of the unsaturated compounds in the hydrotreated effluent stream onto a carrier.

A twelfth aspect includes the method of the eleventh aspect in which adsorption is performed at a temperature between 10° C. and 80° C.

A thirteenth aspect includes the method of any of the first through tenth aspects in which the separator utilizes solvent extraction to generate the LOHC stream based on absorption of the unsaturated compounds in the hydrotreated effluent stream into a solvent.

A fourteenth aspect includes the method of any of the first through thirteenth aspects in which the method further comprises passing a second hydrocarbon stream to the hydrogenation unit in combination with the aromatic compounds stream and the naphthenic stream.

A fifteenth aspect includes the method of the fourteenth aspect in which the second hydrocarbon stream comprises an aromatics-rich stream.

A sixteenth aspect includes the method of any of the first through fifteenth aspects in which the method further comprises transporting the LOHC stream from a first hydrocarbon processing facility to a second hydrocarbon processing facility; and passing the LOHC stream to a dehydrogenation unit to form a dehydrogenated hydrocarbon stream and a hydrogen product stream, wherein the first hydrocarbon processing facility and the second hydrocarbon processing facility are separated by at least 1 km.

A seventeenth aspect includes the method of the sixteenth aspect in which the dehydrogenation unit is a catalytic reformer.

An eighteenth aspect includes the method of any of the first through seventeenth aspects in which the hydrocarbon feed stream comprises less than 0.1 percent by weight sulfur.

A nineteenth aspect includes the method of any of the first through eighteenth aspects in which the hydrocarbon feed stream comprises less than 400 parts per million by weight nitrogen.

A twentieth aspect includes the method of any of the first through nineteenth aspects in which t the hydrocarbon feed stream comprises less than 50 parts per million percent by weight oxygen.

For the purposes of describing and defining the present disclosure it is noted that the terms "about" or "approximately" are utilized in this disclosure to represent the inherent degree of uncertainty that may be attributed to any quantitative comparison, value, measurement, or other representation. The terms "about" and/or "approximately" are also utilized in this disclosure to represent the degree by which a quantitative representation may vary from a stated reference without resulting in a change in the basic function of the subject matter at issue.

Throughout this disclosure ranges are provided. It is envisioned that each discrete value encompassed by the ranges are also included. Additionally, the ranges which may be formed by each discrete value encompassed by the explicitly disclosed ranges are equally envisioned. For brevity, the same is not explicitly indicated subsequent to each disclosed range and the present general indication is provided.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

It is also noted that recitations herein of "at least one" component, element, etc., should not be used to create an inference that the alternative use of the articles "a" or "an" should be limited to a single component, element, etc.

What is claimed is:

1. A method for producing liquid organic hydrogen carriers (LOHCs), the method comprising:
passing a hydrocarbon feed stream to a selective hydrogenation reactor to generate a hydrotreated feed stream, wherein:
the hydrocarbon feed stream comprises at least 30% by weight of aromatics and naphthenes; and
the selective hydrogenation reactor is configured to saturate olefins selectively without aromatic saturation and is operated at an operating temperature of 100° C. to 200° C. and a pressure of from 1 to 100 bar;
passing the hydrotreated feed stream to a fractionation unit to form a light fraction stream and a heavy fraction stream, wherein:
the fractionation unit separates the light fraction stream and the heavy fraction stream at a cut point in the range of 218° C. to 250° C. to retain naphthenes in the light fraction stream;
passing the light fraction stream to an aromatics extraction unit to form an aromatic compounds stream and a non-aromatic compounds stream;
passing the non-aromatic compounds stream to a naphthene separator to generate a naphthenic stream and a non-naphthenic stream;

passing the aromatic compounds stream, the naphthenic stream, and an input hydrogen stream to a hydrogenation unit to form a hydrotreated effluent stream, wherein:

the hydrotreated effluent stream comprises saturated compounds and unsaturated compounds; and passing the hydrotreated effluent stream to a separator to remove the unsaturated compounds to isolate the saturated compounds as a LOHC stream.

2. The method of claim 1, wherein the hydrocarbon feed stream comprises a pyrolysis fuel oil.

3. The method of claim 1, wherein the aromatics extraction unit utilizes solvent extraction to separate the aromatic compounds stream and the non-aromatic compounds stream based on absorption of one or more components into a solvent.

4. The method of claim 3, wherein the solvent utilized in the aromatics extraction unit comprises an organic molecule with an aldehyde side group.

5. The method of claim 3, wherein the weight ratio of the light fraction stream to solvent in the aromatics extraction unit is in the range of 1.5 to 10.

6. The method of claim 1, wherein the naphthene separator utilizes solvent extraction to separate the naphthenic stream and the non-naphthenic stream based on absorption of one or more components into a solvent.

7. The method of claim 6, wherein the solvent utilized in the naphthene separator comprises a polar solvent.

8. The method of claim 1, wherein the hydrogenation unit is operated at reaction conditions of from 150° C. to 300° C. and a pressure of from 1 to 50 bar.

9. The method of claim 1, wherein the hydrogenation unit comprises a hydrotreating catalyst, the hydrotreating catalyst comprising cobalt, molybdenum, or tungsten on an alumina support.

10. The method of claim 1, wherein the separator utilizes molecular sieve separation to generate the LOHC stream based on adsorption of the unsaturated compounds in the hydrotreated effluent stream onto a carrier.

11. The method of claim 10, where adsorption is performed at a temperature between 10° C. and 80° C.

12. The method of claim 1, wherein the separator utilizes solvent extraction to generate the LOHC stream based on absorption of the unsaturated compounds in the hydrotreated effluent stream into a solvent.

13. The method of claim 1, further comprising passing a second hydrocarbon stream to the hydrogenation unit in combination with the aromatic compounds stream and the naphthenic stream.

14. The method of claim 13, wherein the second hydrocarbon stream comprises an aromatics-rich stream.

15. The method of claim 1, further comprising transporting the LOHC stream from a first hydrocarbon processing facility to a second hydrocarbon processing facility; and passing the LOHC stream to a dehydrogenation unit to form a dehydrogenated hydrocarbon stream and a hydrogen product stream, wherein the first hydrocarbon processing facility and the second hydrocarbon processing facility are separated by at least 1 km.

16. The method of claim 15, wherein the dehydrogenation unit is a catalytic reformer.

17. The method of claim 1, wherein the hydrocarbon feed stream comprises less than 0.1 percent by weight sulfur.

18. The method of claim 1, wherein the hydrocarbon feed stream comprises less than 400 parts per million by weight nitrogen.

19. The method of claim 1, wherein the hydrocarbon feed stream comprises less than 50 parts per million percent by weight oxygen.

* * * * *